United States Patent

[11] 3,616,238

| [72] | Inventors | William W. Andres<br>Lindenhurst, Ill.;<br>Martin Paul Kunstmann, Pearl River, N.Y. |
|---|---|---|
| [21] | Appl. No. | 51,016 |
| [22] | Filed | June 29, 1970 |
| [23] | | Division of Ser. No. 735,987, June 11, 1968, Pat. No. 3,557,151 |
| [45] | Patented | Oct. 26, 1971 |
| [73] | Assignee | American Cyanamid Company<br>Stamford, Conn. |

[54] METHOD OF PREPARING (+)-5'-HYDROXYGRISEOFULVIN
8 Claims, No Drawings

[52] U.S. Cl. .................................................. 195/80, 195/51 R

[51] Int. Cl. ................................................... C12d 9/00
[50] Field of Search ........................................... 195/80; 195/51 R

[56] References Cited
UNITED STATES PATENTS

| 3,530,146 | 9/1970 | Newman et al. .............. | 195/80 X |
| 3,532,714 | 10/1970 | Newman et al. .............. | 195/80 X |

*Primary Examiner*—Joseph M. Golian
*Attorney*—Ernest Y. Miller

ABSTRACT: The compound (+)-5'-hydroxygriseofulvin is produced by fermentation from dehydrogriseofulvin or (+)-griseofulvin using the micro-organism *Streptomyces cinereocrocatus*. The compound (+)-5'-hydroxygriseofulvin is an antifungal agent.

METHOD OF PREPARING (+)-5'-HYDROXYGRISEOFULVIN

This application is a division of our application Ser. No. 753,987, filed June 11, 1968 now Pat. No. 3,557,151

SUMMARY OF THE INVENTION

This invention relates to the compound, (+)-5'-hydroxygriseofulvin produced by fermentation, and methods for its recovery and purification.

The invention is based on the discovery that the fermentation of selected substrates under controlled conditions with a strain of *Streptomyces cinereocrocatus* n.s. (Lederle AC209) leads to the formation of (+)-5'-hydroxygriseofulvin. The invention includes within its scope the compound as a crude concentrate and in its crystalline form.

The compound produced by the present process may be illustrated by the following general formula:

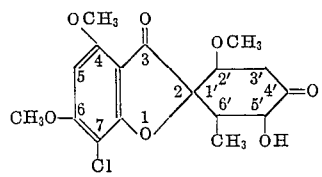

The new species, *S. cinereocrocatus* n.s., was isolated from a soil sample collected in the State of Ohio. A viable culture of the organism (Lederle AC209) has been deposited with the Culture Collection Laboratory, Northern Utilization Research and Development Division, U.S. Department of Agriculture, Peoria, Illinois and has been added to its permanent collection and is freely available to the general public as NRRL 3443.

The following is a general description of the organism *S. cinereocrocatus* n.s. based on the diagnostic characteristics observed. The underscored descriptive colors are taken from Jacobson, et al., "Color Harmony Manual" 3rd Ed. Container Corp. of America Chicago, (1948).

AMOUNT OF GROWTH

Moderate to good to heavy on most media.

AERIAL MYCELIUM AND/OR EN MASSE SPORE COLOR

Aerial mycelium yellowish on most media; sporulation grayish, approximating Ashes (5 Fe to 7 Fe), good to heavy on most media.

SOLUBLE PIGMENTS

Yellowish on several media; light to moderate when present. Absent on Czapek's Solution, yeast extract, Bennett's and inorganic salt-starch agars.

REVERSE COLOR

In yellowish shades on most media.

MISCELLANEOUS PHYSIOLOGICAL REACTIONS

Nitrates not reduced to nitrites in organic nitrate broth; no liquefaction of gelatin; no melanin produced on peptone-iron agar. Carbon source utilization according to the Pridham and Gottlieb [J. Bact. 56: 107–114 (1948)] method as follows: Fair to good utilization of l-arabinose, d-fructose, sucrose, d-trehalose, d-xylose and dextrose; poor to nonutilization of adonitol, i-inositol, lactose, d-mannitol, d-melezitose, d-melibiose, d-raffinose, l-rhammose, and salicin.

MICROMORPHOLOGY

Spores in straight to well-formed but loosely spiralled chains. Spores mostly elongate to somewhat elliptical, $0.5 - 0.6\mu\pi \times 1.1 - 1.5\mu$. Smooth walled as determined by electron microscopy at 8000X.

The culture (Lederle AC209) possessed several well-defined characteristics, which individually were not unusual, but in their existing combination they were significantly different from other previously described Streptomyces species. Searches through devised keys and culture descriptions failed to produce a suitable identification of the organism. Likewise, when comparisons were made of (AC209) with all available reference specimens of streptomycetes having similar basic features, none corresponded closely enough to be considered synonymous. As a result of the novelty of the culture, a new species named *Streptomyces cinereocrocatus* n.s. is proposed to be descriptive of the ash-gray color of the spores coupled with the yellow color of the vegetative mycelium.

Observations were made of the cultural, morphological and physiological characteristics of the new species *Streptomyces cinereocrocatus* in accordance with the methods detailed by Shirling et al., Internat. Journ. of Syst. Bacteriol. 16:313–340 (1966). Media used in the studies are selected from those recommended by Pridham et al. antibiotics Annual (1956–1957 pages 947–953 for the cultivation of Streptomyces. Details are recorded in tables I–IV as follows. The underscored descriptive colors are taken from Jacobson et al., "Color Harmony Manual," 3rd Edit. Container Corp. of America Chicago 1948.

TABLE I

Cultural characteristics of *Strepomyces cinereocrocatus* NRRL No. 3443

| Medium | Amount of growth | Aerial mycelium and/or spores | Soluble pigment | Reverse color | Remarks |
|---|---|---|---|---|---|
| Czapek's solution agar | Good | Aerial mycelium yellowish, becoming Covert Gray (2 fe) in sporulation zones. Sporulation good. | None | Pastel yellow (1½ fb) | |
| Asparagine dextrose agar | do | Aerial mycelium yellowish, becoming Ashes (5 fe) to (7 fe) in sporulation zones. Sporulation good. | Yellowish; light. | do | Colony margins stoloniferous. |
| Tomato paste agar | Heavy | Aerial mycelium yellowish, becoming Ashes (5fe) in sporulation zones. Sporulation good. | Yellowish; moderate. | Amber (3 lc) | |
| Hickey and Tresner's agar | do | Aerial mycelium yellowish, becoming Ashes (5 fe) in sporulation zones. Sporulation heavy. | Yellowish; light. | Mustard (2 le). | Do. |
| Yeast extract agar | do | Aerial mycelium yellowish, becoming Ashes (5 fe) to (7 fe) in sporulation zones. Sporulation very heavy. | None | Pastel yellow (1½ fb). | Do. |
| Kuster's oatflake agar | do | Aerial mycelium yellowish-white, becoming Ashes (5 fe) in sporulation zones. Sporulation very heavy. | Yellowish; light. | Lt. antique gold (1½ ic). | Colonies spreading broadly. |
| Tomato paste oatmeal agar | do | Aerial mycelium yellowish, becoming Ashes (5 fe) to (7 fe) in sporulation zones. Sporulation very heavy. | Yellowish; moderate. | Amber (3 lc) | Colonies spreading. |
| Potato dextrose agar | do | Aerial mycelium yellowish, becoming Ashes (5 fe) to (7 fe) in sporulation zones. Sporulation heavy. | Yellowish; light. | do | Colonies spreading; margins stoloniferous. |
| Bennett's agar | Good | Aerial mycelium yellowish, becoming Ashes (5 fe) in sporulation zones. Sporulation moderate. | None | Mustard (2 le). | |
| Inorganic salts-starch agar | Moderate | Aerial mycelium yellowish-white, becoming grayish in sporulation areas. Sporulation very light. | do | Parchment (1½ db). | |

Note.—Incubation; 14 days. Temperature; 28°C.

TABLE II

Micromorphology of *Streptomyces cinereocrocatus* NRRL No. 3443

| Medium | Aerial mycelium and/or sporiferous structures | Spore shape | Spore size | Spore surface |
| --- | --- | --- | --- | --- |
| Kuster's oatflake agar | Aerial mycelium loose. Sporiferous branches occuring as a mixture of straight and well-formed, but loosely spiralled spore chains. | Mostly elongate to somewhat elliptical. | 0.5-0.6µ x 1.1-1.5 µ. | Spore surface smooth as determined by electron microscopy at 8,000 X. |

TABLE III miscellaneous physiological reaction of *Streptomyces cinereocrocatus* NRRL

| Medium | Incubation period, days | Amount of growth | Phsiological reaction | Remarks |
| --- | --- | --- | --- | --- |
| Organic nitrate broth | 7 | Good | Nitrates not reduced. | |
| Do | 14 | do | do | |
| Gelatin | 7 | do | No liquefaction. | |
| Do | 14 | do | do | |
| Peptone-iron Agar | 1 | do | No melanin produced. | |

NOTE.—Temperature: 28° C.

TABLE IV

Carbon Source Utilization Pattern of *Streptomyces cinereocrocatus* NRRL No. 3443

[Incubation time 10 days and temperature 28° C.]

| Carbon source | Utilization* | Carbon source | Utilization* |
| --- | --- | --- | --- |
| Adonital | 1 | d-Raffinose | 1 |
| l-arabinose | 3 | l-rhamnose | 1 |
| d-Fructose | 3 | Salicin | 1 |
| i-Inositol | 0 | Sucrose | 2 |
| Lactose | 1 | d-Trehalose | 3 |
| d-Mannitol | 1 | d-Xylose | 2 |
| d-Melezitose | 1 | Dextrose | 3 |
| d-Melibiose | 1 | Negative control | 0 |

*3-Good utilization; 2-Fair utilization; 1-Poor utilization 0-No utilization.

It is intended that for the production of the novel described compound the present invention is not limited to this particular organism only, nor to organisms fully answering the above growth and microscopic characteristics which are given for illustrative purposes. In fact, it is described and intended to include the use of mutants produced from the described organism by various means, such as x-radiation, ultraviolet radiation, nitrogen mustard, phage exposure and the like.

THE FERMENTATION PROCESS

Cultivation of the organism *S. cinereocrocatus* n.s. NRRL No. 3443 may be carried out in a wide variety of liquid culture media. Media which are useful for the production of (+)-5'-hydroxygriseofulvin include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chloride, etc. Trace elements such as boron, molybdenum, copper, etc., and supplied as impurities of other constituents of the media. Aeration in tanks and bottles is provided by forcing sterile air through or onto the surface of the fermenting medium. Further agitation in tanks is provided by a mechanical impeller. An antifoaming agent, such as lard oil may be added as needed.

INOCULUM PREPARATION

Sharker flask "seed" inoculum is prepared by inoculating 100 milliliter portions of sterile medium in 500 milliliter flasks with scrapings or washings of spores from an agar slant of the culture. Either of the following two media are ordinarily used.

| Soy flour X200 | 10 grams | (med. no. A-6) |
| --- | --- | --- |
| Glucose | 20 grams | |
| Corn steep liquor | 5 grams | |
| Calcium carbonate | 3 grams | |
| Water to | 1,000 milliliters | | or

| Corn starch | 30 grams |
| --- | --- |
| Molasses | 20 grams |
| Soy flour X200 | 10 grams |
| Calcium carbonate | 10 grams |
| Yeast extract | 2.5 grams |
| Water to | 1,000 milliliters |

The flasks are incubated at a temperature from 25°-29° C., preferably 28° C., and agitated vigorously on a rotary shaker for about 48 to 72 hours. These 100 milliliter portions of "seed" inoculum may be used to inoculate shake flask fermentations or to inoculate 1 liter and 12 liter batches of the same medium in 2 liter and 20 liter glass fermentors. The inoculum mash of the 2 liter and 20 liter glass fermentors is aerated with forced sterile air while growth is continued for 40 to 50 hours. These batches of inocula in turn are used to inoculate tank fermentors.

SHAKE FLASK OR TANK FERMENTATION

For the production of the novel compound in shake flask or tank fermentations, the following fermentation medium is preferably used.

| Corn starch | 30 grams | (med. no. 48-2) |
| --- | --- | --- |
| Molasses | 20 grams | |
| Soy flour X200 | 10 grams | |
| Calcium carbonate | 10 grams | |
| Yeast extract | 2.5 grams | |
| Water to | 1,000 milliliters. | |

Each shake flask or tank fermentor containing sterile medium is inoculated with 3 to 10 percent of inoculum made as described above. The fermentation mash is maintained at a temperature of 25°-29° C., preferably 28° C., and agitated vigorously for 18 to 36 hours on a rotary shaker or by an impeller driven at 200-400 r.p.m. Substrate, dissolved in an appropriate solvent, is then added to the fermentation mash usually giving a concentration of from 25 to 125 micrograms of substrate per milliliter of mash. The fermentation is allowed to proceed for an additional 48 to 96 hours, at which time the mash is harvested.

ISOLATION PROCEDURE

After the fermentation is completed, the fermented mash containing the novel compound of this invention is filtered, preferably at pH 6-7, to remove the mycelium. Diatomaceous earth or any other conventional filtration aid may be used to assist in the filtration. Normally, the mycelial cake is washed with water and the wash if pooled with the filtrate. The combined filtrate and wash is extracted with two portions of chloroform (each portion being about one-third the volume of the filtrate and wash) which are combined and concentrated under reduced pressure to a residue. In place of chloroform, other solvents such as ethyl acetate, butanol, methylene chloride, etc., can be used. This residue is then subjected to partition chromatography on a diatomaceous earth column using a solvent system composed of n-hexane, ethyl acetate, methanol, water (70:30:15:6). The column effluent, continuously monitored using percent transmission at about 245 mµ, is collected in separate fractions of suitable volume. The novel compound of this invention is eluted approximately between the sixth and seventh hold-back-volumes. Fractions of effluent containing the novel compound of this invention are pooled and the compound recovered therefrom using standard techniques.

PHYSICAL PROPERTIES OF (+)-5'-HYDROXYGRISEOFULVIN

A microanalytical sample of (+)-5'-hydroxygriseofulvin, prepared by crystallization from acetone/hexane, followed by drying *in vacuo* with $P_2O_5$ overnight, melted at 222°–224° C. Optical rotation $=[\alpha]_D{}^{25}=+292°(+3°)$ (C=1.000 in $CHCl_3$). Ultraviolet maxima measured in millimicrons occur at:

in methanol ($\epsilon$) : 211 (21,500), 217 (21,150) 235 (20,940), 292 (21,500), 325 (4,790)

In 0.1N KOH ($\epsilon$) : 215 (29,800), 235 (18,925), 250sh in methanol (14,700), 295 (22,100), 332 (4,785)

in 0.1N HCL ($\epsilon$) : 210 (20,950), 236 (18,750), 250sh in methanol (15,450), 295 (22,100), 332 (4,785)

The mass spectrum showed a molecular ion at 368. The nmr spectrum (60Mc, $CDCL_3$) showed peaks at (relative to TMS) 66 c.p.s. doublet (3H); ≈150 c.p.s. multiplet (1H): 219 c.p.s. singlet (3H); 239 c.p.s. singlet (3H); 242 c.p.s. singlet (3H); 281 c.p.s. doublet (1H); 336 c.p.s. singlet (1H); 368 c.p.s. singlet (1H).

The production of (+)-5'-hydroxygriseofulvin may be illustrated with the following flow chart

FLOWCHART

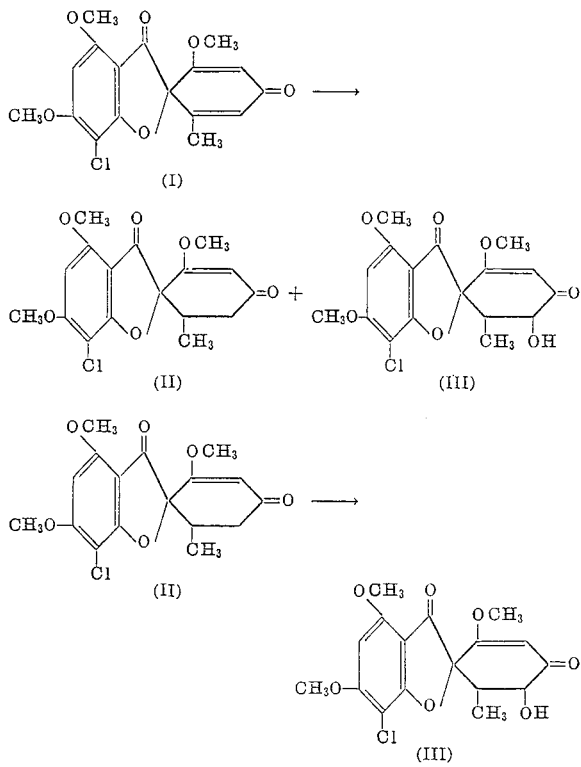

Thus, it can be understood that either dehydrogriseofulvin (I) or (+)-griseofulvin (II) may be used as starting compounds or substrates with the fermentation of *S. cinereocrocatus* n.s. to produce (+)-5'-hydroxygriseofulvin. Both dehydrogriseofulvin and (+)-griseofulvin are described in the literature, as, for example, by J. F. Grove, Quarterly Reviews, 17, 1 (1963) (and references cited therein).

UTILITY (+)-5'-Hydroxygriseofulvin shows significant antifungal activity against a variety of fungi when tested using the agar dilution method. In this test graded amounts of (+)-5'-hydroxygriseofulvin were incorporated in fluid nutrient agar and the mixtures were placed in Petri dishes. Dilute suspensions of the various fungal cultures were applied to the hardened agar surfaces. After appropriate incubation periods, the plates were examined to determine the lowest concentration levels at which growth was inhibited. Table V below summarizes results observed with (+)-5'-hydroxygriseofulvin.

TABLE V

Antifungal Activity of (+)-5'-hydroxygriseofulvin

Minimal Inhibitory Concentration in $\mu$g./ml.

| | |
|---|---|
| *Candida albicans* 300 (E83) | >64 |
| *Cryptococcus neoformans* SP (E138) | >64 |
| *Epidermophyton floccosum* ATCC 10227 (E139) | 8 |
| *Microsporum audouini* ATCC 14057 (E140) | 8 |
| *Microsporum canis* ATCC 10214 (E55) | 10 |
| *Microsporum gypseum* ATCC 14683 (E130) | 4 |
| *Phialophthora jeanselmei* NIH 8724 (E16) | >64 |
| *Trichophyton mentagrophytes* (E (E11) | 8 |
| *Trichophyton rubrum* (E97) | 4 |
| *Trichophyton tonsurans* NIH 662 (E10) | 4 |

Where > represents greater than

Further, (+)-5'-hydroxygriseofulvin has been found to have significant activity against *Microsporum canis* when tested as a topical antifungal agent with guinea pigs. In this test albino, male guinea pigs, Hartley strain, 300–500 grams were infected dermally with 0.5 milliliter of a 1 to 10 dilution of a standard *M. canis* infective hair suspension, to a prepared site on the left side of each guinea pig. The infective hair suspension was prepared by the following procedure: Guinea pigs infected with 0.5 ml. of an undiluted or a 1 to 10 dilution of suspension from a preceding passage served as donors of infected hairs. Virulence of the infecting organism was maintained by animal to animal passage. At a time from 7 to 14 days postinfection, but normally on the 14th day, hairs were pulled from the infected area and examined for fluorescence under ultraviolet light. Only hairs showing intense fluorescence at the root were selected. The selected hairs were weighed and ground into suspension in sufficient diluent to give a final concentration of 3 milligrams of hair per milliliter of diluent. The diluent used was Sabouraud's medium (1 percent enzymatic protein digest and 2 percent dextrose), medicated by addition of 100 micrograms per milliliter of potassium penicillin G and 100 micrograms per milliliter of dihydrostreptomycin sulfate. This hair suspension is identified as undiluted stock hair suspension was examined for purity, and its content of viable organisms (spores) was determined by seeding 10-fold dilutions in agar plates containing 1 percent enzymatic protein digest, 1 percent dextrose, 1.5 percent dehydrated fresh oxbile preparation, 2 percent agar, and 0.001 percent crystal violet, and incubating for 7 days at 30°±2° C. Before the inoculum was applied, the hair was cut with an electric clipper and the shorn area cleared of hair debris and scurf with a couple of brisk strokes with a fiber hand brush. The inoculum was applied with a pipette. The tip of the pipette containing a single dose was pressed against the guinea pig skin and was then removed in a circular path completely covering an area of about 3 centimeters in diameter until the entire dose had been thoroughly rubbed into the skin. There was no runoff of inoculum at the completion of inoculation, and the inoculated area appeared reddened from the continuous excoriating action of the pipette tip. The application of inoculum took approximately 1 minute per guinea pig.

The test compound was prepared into a 2 percent ointment in a carbowax base. After inoculation, test animals were treated once daily by rubbing the drug-containing composition into the infected area. Controls were treated with appropriate vehicles containing no drug. Treatment was begun on the third day postinfection and continued for 5 days (i.e., until day 7). Hair culture scores on day 10 and day 17 postinfection were determined as follows: Four tufts of hair, one from each of four equidistant spots on the periphery of the infected area, were plucked and macerated in 5 milliliters of medicated Sabouraud's medium. Maceration was achieved by grinding the hairs with a motor-driven stainless steel pestle. The pestle was cleansed between samples by wiping with isopropyl alcohol. One-half milliliter of the resulting suspension was seeded in agar plates containing 1 percent enzymatic protein digest, 1 percent dextrose, 1.5 percent dehydrated fresh oxbile preparation, 2 percent agar, and 0.001 percent crystal violet. The plates were examined for typical *Microsporum canis* growth after incubation for 7 days at 30°± 2° C. The amount of growth was rated as follows:

| | |
|---|---|
| no colonies | = 0 |
| 1–10 colonies | = + |
| 11–100 colonies | = ++ |
| 101–1,000 colonies | = +++ |
| More than 1,000 colonies | = ++++ |

Table VI below, lists the results obtained in two separately run tests. Numbers in parentheses indicate the number of animals used.

TABLE VI

| Preparation Tested | Hair Culture Score | |
|---|---|---|
| | 10* | 17* |
| (+)-5'-hydroxgriseofulvin(2) | ++ | +++ |
| (+)-5'-hydroxygriseofulvin(2) | ++ | +++ |
| Carbowax control (5) | ++++ | ++++ |

*Relative concentration of viable organisms per hair sample scored on the 10th and 17th day postinfection.

DETAILED DESCRIPTION

The following examples described in detail the fermentation, isolation and purification to produce (+)-5'-hydroxygriseofulvin using the organism *Streptomyces cinereocrocatus* n.s.

EXAMPLE I

Microbiological Conversion of (+)-Griseofulvin into (+)-5'-Hydroxygriseofulvin

Inoculum Preparation (I A)

A typical medium used to grow the primary inoculum of *S. cinereocrocatus* n.s. is prepared according to the following formula:

| (Med. 48–2) | |
|---|---|
| Corn starch 52 30 grams | |
| Molasses | 20 grams |
| Soy flour X200 | 10 grams |
| Calcium carbonate | 10 grams |
| Yeast extract | 2.5 grams |
| Water to | 1,000 milliliters. |

The washed or scraped spores from an agar slant of *S. cinereocrocatus* n.s. is used to inoculate one 500 milliliter flask containing 100 milliliters of the above medium. The flask is placed on a rotary shaker and agitated vigorously for 48 hours at 28° C. The resulting flask inoculum is used to inoculate 1 liter of the same medium in a 2-liter glass fermentor. The inoculum mash is aerated with sterile air while growth is continued for about 48 hours, after which time the contents are used to seed a 30-liter tank fermentor.

Fermentation (I B)

A fermentation medium was prepared according to the following formula:

| (Med. 48–2) | |
|---|---|
| Corn starch | 30 grams |
| Molasses | 20 grams |
| Soy flour X200 | 10 grams |
| Calcium carbonate | 10 grams |
| Yeast extract | 2.5 grams |
| Water to | 1,000 milliliters. |

The fermentation medium is sterilized at 120° C. with steam at 20 pounds pressure for about 90 minutes. The pH of the medium after sterilization is 7.0. Thirty liters residue the sterile medium in a residue 40 liter tank fermentor is inoculated with 1 liter of inoculum, obtained as described above, and the fermentation is carried out at 28° C. using lard oil as a defoaming agent. Aeration is supplied at the rate of 1.0 liter of sterile air per liter of mash per minute. The mash is agitated by an impeller driven at 200 revolutions per minute. After 24 hours of fermentation time, 1.5 grams of (+)-griseofulvin dissolved in 75 milliliters of acetone is added to the fermenting mash and the fermentation is continued for 66 hours. At the end of this period the mash is harvested.

Isolation (I C)

Twenty-eight liters of fermentation mash (pH 6.9) is clarified by filtration through Hyflo and the filtrate is extracted with two 8-liter portions of chloroform. The combined chloroform extract is concentrated under reduced pressure to a residue (2.2 g.). The residue is purified by partition chromatography on a column (500 g.) diatomaceous earth. The column support is prepared by mixing 0.75 milliliters of the lower phase from the solvent system composed of hexane, ethyl acetate, methanol, water (70:30:15:6) with each gram of diatomaceous earth. The residue, dissolved in a small amount of lower phase, is mixed with a small amount of diatomaceous earth, and charged to the column. The upper phase of the above solvent system is used to elute the column. The column effluent is monitored at 245 m$\mu$; the peak, located approximately between the sixth and seventh holdback volumes, corresponded to (+)-5'-hydroxygriseofulvin. Appropriate fractions of effluent containing the desired product are combined and concentrated to a residue under reduced pressure. The residue is dissolved in acetone and the solution decolorized with activated charcoal. Hexane is added to the decolorized solution and concentration of this solution precipitates (+)-5'-hydroxygriseofulvin. The crystals are separated by filtration, 170 milligrams, melting point 222°–224° C.

EXAMPLE II

Microbiological Conversion of (+)-Griseofulvin Into (+)-5'-Hydroxygriseofulvin

Inoculum Preparation (II A)

The washed or scraped spores from an agar slant of *S. cinereocrocatus* n.s. are used to inoculate two 500 milliliter flasks containing 100 milliliters each of the medium described in I A and I B of example I. The flasks are placed on a rotary shaker and agitated vigorously for 48 hours, at 28° C. The resulting flask inoculum is transferred to a 5 gallon glass fermentor containing 12 liters of the same sterile medium. The glass fermentor is aerated with sterile air while growth is carries out for about 48 hours, after which the contents are used to seed a 300 liter tank fermentor.

FERMENTATION (II B)

A fermentation medium, prepared as described in I A and I B of example I, is sterilized at 120° C. with steam at 20 pounds pressure for about 90 minutes. The pH of the medium after sterilization is 6.6. Three hundred liters of sterile medium in a 400 liter tank fermentor is inoculated with 12 liters of inoculum, obtained as described in II A above and the fermentation is carried out at 28° C. using lard oil as defoaming agent. Aeration is supplied at the rate of 0.7 liter of sterile air per liter of mash per minute. The mash is agitated by an impeller driven at 200 revolutions per minute. After 25 hours of fermentation time, 15 grams of (+)-griseofulvin dissolved in 800 ml. of acetone is added to the fermentation as substrate. The fermentation is allowed to proceed for an additional 66 hours at which time the mash is harvested.

ISOLATION (II C)

Two hundred liters of fermentation mash (pH 6.9) is clarified by filtration through Hyflo and the filtrate is extracted with two one-third volumes of chloroform. The combined chloroform extract is concentrated to a residue (15.4 grams) under reduced pressure. The residue is purified by means of partition column chromatography on 1,700 grams of diatomaceous earth in a manner essentially as described in example I C. Crystallization of the crude product obtained from acetone-hexane yields 2.4 grams of purified (+)-5'-hydroxygriseofulvin, melting point 222°–224° C.

EXAMPLE III

Microbiological Conversion of Dehydrogriseofulvin Into (+)-Griseofulvin and (+)-

Inoculum Preparation (III A)

The washed or scraped spores from an agar slant of *S. cinereocrocatus* n.s. are used to inoculate a 500 milliliter flask containing 100 milliliters of the following medium:

| (Med. A-6) | |
| --- | --- |
| Glucose | 20 grams |
| Soy flour X200 | 10 grams |
| Corn Steep liquor | 5 grams |
| Calcium carbonate | 3 grams |
| Water to | 1,000 milliliters. |

The flask is placed on a rotary shaker and agitated vigorously for 72 hours at 28° C. after which time the contents are used to seed 500 milliliter flasks in carrying out flask fermentations.

Fermentation (III B)

A fermentation medium is prepared according to the following formula:

| (Med. 48-2) | |
| --- | --- |
| Corn starch | 30 grams |
| Molasses | 20 grams |
| Soy flour X200 | 10 grams |
| calcium carbonate | 10 grams |
| Yeast extract | 2.5 grams |
| Water to | 1,000 milliliters |

The fermentation medium is sterilized at 120° C. with 15 pounds of pressure for 20 minutes. Each of three 500-milliliter flasks containing 100 milliliters of the above sterilized medium are inoculated with 5 milliliters of inoculum prepared as described in (III A). The flasks are incubated at 28° C. for 24 hours while being vigorously agitated on a rotary shaker. At the end of this period, 2.0 milliliters of a solution of dehydrogriseofulvin in methanol (5 mg./ml.) is aseptically added to each flask, resulting in a mixture of 100 micrograms of substrate per milliliter of fermentation medium. Fermentation is continued for an additional 48 hours at 28° C. with agitation on a rotary shaker. At the completion of this period the fermentation mash is harvested.

Isolation (III C)

Three hundred milliliters of fermentation mash is filtered through Hyflo and the filtrate is extracted with 150 milliliters of chloroform. The chloroform extract is dried using anhydrous sodium sulfate and the dried extract is concentrated to a residue under reduced pressure. The residue is purified by means of partition column chromatography on 50 grams of diatomaceous earth in a manner essentially as described in example I C. The (+)-griseofulvin is eluted in the third through fifth holdback volumes and (+)-5'-hydroxygriseofulvin from the sixth and seventh holdback volumes. A combination of monitoring the column effluent with ultraviolet light and thin layer chromatography is used to determine in which of the several fractions each of the compounds is located. Appropriate fractions are combined and concentrated separately to dryness under reduced pressure. The residues are recrystallized from methanol: 8 mg. of (+)-griseofulvin, melting point 223°–225° C. and 4 mg. of (+)-5'-hydroxygriseofulvin, melting point 227°–229° C., are obtained.

We claim:

1. A method of preparing (+)-5'-hydroxygriseofulvin which comprises subjecting a compound selected from the group consisting of dehydrogriseofulvin and (+)-griseofulvin to fermentation in an aqueous nutrient medium containing assimilable sources of carbohydrate, nitrogen and inorganic salts, under aerobic conditions, in the presence of *Streptomyces cinereocrocatus* n.s.

2. A method for preparing (+)-5'-hydroxygriseofulvin which comprises subjecting (+)-griseofulvin to fermentation in an aqueous nutrient medium containing assimilable sources of carbohydrate, nitrogen and inorganic salts under aerobic conditions in the presence of *Streptomyces cinereocrocatus* n.s. and recovering said compound therefrom.

3. A method for preparing (+)-5'-hydroxygriseofulvin which comprises subjecting dehydrogriseofulvin to fermentation in an aqueous nutrient medium containing assimilable sources of carbohydrate, nitrogen and inorganic salts under aerobic conditions in the presence of *Streptomyces cinereocrocatus* n.s. and recovering said compound therefrom.

4. A method in accordance with claim 1 in which the product is recovered by extraction with a solvent and partition chromatography.

5. A method in accordance with claim 1 in which the product is extracted from the fermentation mash with chloroform and purified by partition chromatography.

6. A method which comprises cultivating *Streptomyces cinereocrocatus* NRRL No. 3443 in an aqueous nutrient medium containing assimilable sources of carbohydrate, nitrogen and inorganic salts under aerobic conditions for a period of from 18 to 96 hours and at a temperature of from 25° to 29° C. in the presence of a compound selected from the group consisting of dehydrogriseofulvin and (+)-griseofulvin and recovering (+)-5'-hydroxygriseofulvin therefrom.

7. A method which comprises cultivating *Streptomyces cinereocrocatus* No. 3443 in an aqueous nutrient medium containing assimilable sources of carbohydrate, nitrogen and inorganic salts under aerobic conditions for a period of from 18 to 96 hours and at a temperature of form 25° to 29° C. in the presence of dehydrogriseofulvin and recovering (+)-5'-hydroxygriseofulvin therefrom.

8. A method which comprises cultivating *Streptomyces cinereocrocatus* NRRL No. 3443 in an aqueous nutrient medium containing assimilable sources of carbohydrate, nitrogen and inorganic salts under aerobic conditions for a period of from 18 to 96 hours and at a temperature of from 25° to 29° C. in the presence of (+)-griseofulvin and recovering (+)-5'-hydroxygriseofulvin therefrom.

* * * * *